United States Patent [19]

Corrigall et al.

[11] Patent Number: 4,540,871
[45] Date of Patent: Sep. 10, 1985

[54] WELDING GUN WITH MULTI-DIRECTIONAL SWITCH

[75] Inventors: Don J. Corrigall; Floyd D. Hansen; James R. Kujawa, all of Appleton, Wis.

[73] Assignee: Miller Electric Manufacturing Company, Appleton, Wis.

[21] Appl. No.: 502,055

[22] Filed: Jun. 7, 1983

[51] Int. Cl.³ .............................................. B23K 9/00
[52] U.S. Cl. ............................ 219/137.63; 200/61.85; 219/137.31
[58] Field of Search ............... 219/137.31, 137.63; 200/52 R, 61.85, 61.58 R, 157, 276

[56] References Cited

U.S. PATENT DOCUMENTS

| 2,270,687 | 1/1942 | Morse | 200/276 |
| 2,651,689 | 9/1953 | Bame | 200/61.78 |
| 3,469,070 | 9/1969 | Bernard et al. | 219/137.31 |
| 3,596,049 | 7/1971 | Ogden | 219/136 |
| 3,706,864 | 12/1972 | Gamble | 200/83 B |
| 3,743,798 | 7/1973 | Pentecost | 200/5 R |
| 3,746,814 | 7/1973 | Lackey et al. | 200/157 |
| 3,783,233 | 1/1974 | dal Molin | 219/137.63 |
| 3,980,860 | 9/1976 | Howell et al. | 219/137.41 |

FOREIGN PATENT DOCUMENTS 1372023 8/1964 France .

Primary Examiner—Roy N. Envall, Jr.
Assistant Examiner—Alfred S. Keve
Attorney, Agent, or Firm—Sughrue, Mion, Zinn, Macpeak and Seas

[57] ABSTRACT

A welding gun having a switch comprising two spaced apart coaxial conducting springs which act as switch contacts for completing a circuit to initiate a welding process. A coaxial flexible wall in the handle of the welding gun surrounds the two springs such that, when a welding machine operator depresses the flexible wall, the two springs make electrical contact to complete the circuit. When the flexible wall is released, the springs return to their original positions, thereby interrupting the electrical circuit.

8 Claims, 6 Drawing Figures

WELDING GUN WITH MULTI-DIRECTIONAL SWITCH

BACKGROUND OF THE INVENTION

1. Field of the Invention

This invention relates generally to the field of welding guns and, more particularly, to a welding gun having an improved switch which can be manually operated by a welding machine operator to initiate a welding process regardless of the orientation of the welding gun in the operator's hand.

2. Description of the Prior Art

Welding guns, especially those used for gas metal arc welding, normally have a trigger mechanism for operating a switch for starting and stopping a welding process. Typically, this trigger mechanism is a lever arrangement located on the handle of the gun near the arc end thereof. Most welding machine operators judge as convenient a trigger mechanism that depresses easily and has overtravel, because the operator wants both a low depression force to reduce fatigue and also overtravel to reduce sensitivity so that, when he must reposition his hand during long welds, the switch does not release to open the welding circuit and stop the welding process.

The position of the trigger mechanism on the handle of the welding gun is also important. The nature of some welding procedures often dictates that a trigger mechanism actuated from the top of the welding gun is most convenient. However, other welding procedures may dictate that a bottom actuated trigger is more convenient, while still other weld procedures make side triggers more convenient. Furthermore, some operators prefer to actuate the trigger with their thumb, while others prefer to use the other fingers of their hand.

In summary, a good welding gun trigger mechanism will have the following features:

A. Easily depressed.
B. Overtravel to reduce sensitivity from opening.
C. Be easily repositionable so that the trigger can be actuated from the top, sides or bottom of the handle of the welding gun.

To address feature C, above, some gun manufacturers have made provisions for repositioning the trigger mechanism with respect to the arc end of the gun. In some cases they have provided means which permit the handle to be disassembled and then reassembled in such a way that the position of the trigger on the handle is changed. In other cases, they have designed the welding gun so that the arc end can be repositioned with respect to the handle and the trigger; this result is normally accomplished by some sort of rotatable head tube and lock unit assembly. However, the flaws in both of these cases are obvious. In the first case, the gun must be dismantled to adjust the relative position of the trigger. The second case requires less effort, but the welding current must pass through a movable joint. Futhermore, to make and properly secure a good electrical connection often requires tools. Sometimes, this feature of making the trigger repositionable is accomplished by a combination of the two cases if the handle is disassembled to make the positioning arrangement operable. In another case, a separate trigger switch assembly is externally clamped to the welding gun. In such a case the trigger projects outwardly from the profile of the welding gun handle, the electrical conductors connecting the switch get in the way of the operator, and the switch itself is bulky and vulnerable to abuse.

These and other prior art welding guns with trigger mechanism are shown, for example, in U.S. Pat. Nos. 3,469,070, 3,596,049, 3,783,233 and 3,980,860. Furthermore, switches generally employing spring conductors are shown in U.S. Pat. Nos. 2,651,689, 3,706,864 and 3,743,798 and in French Pat. No. 1,372,023.

However, until the present invention, no one has made a welding gun having a switch that can be operated from any direction with overtravel, and without requiring dismantling of the gun or the use of tools. Nor is there available in the prior art any welding gun in which the trigger mechanism can be repositioned during actual welding.

SUMMARY OF THE INVENTION

Therefore, the primary object of this invention is to provide a welding gun with a multi-directional switch mechanism which does not have to be repositioned relative to the welding gun handle to accomodate different welding positions. A further object is to provide such a multi-directional switch mechanism which is easily depressed, and which provides overtravel to reduce sensitivity from opening.

A preferred embodiment of the invention can be summarized as a switch mechanism for a welding gun wherein a portion of the welding gun handle is provided with a flexible wall which completely encircles the periphery of the handle. Mounted inside the welding gun handle and coaxial with the flexible wall are an outer conducting coil spring and an inner conducting coil spring which are spaced apart. Each spring is connected to a different side of an electrical circuit which must be closed to initiate a welding process. To initiate the welding process, the operator merely depresses the flexible wall which causes the outer spring to contact the inner spring, thereby completing the electrical circuit. A void is provided inwardly of the inner spring to provide for overtravel. When the operator desires to interrupt the welding process, he merely releases the flexible wall, thereby permitting the two springs to return to their original positions and open the electrical circuit.

DETAILED DESCRIPTION OF THE PREFERRED EMBODIMENTS OF THE INVENTION

Figure 1:
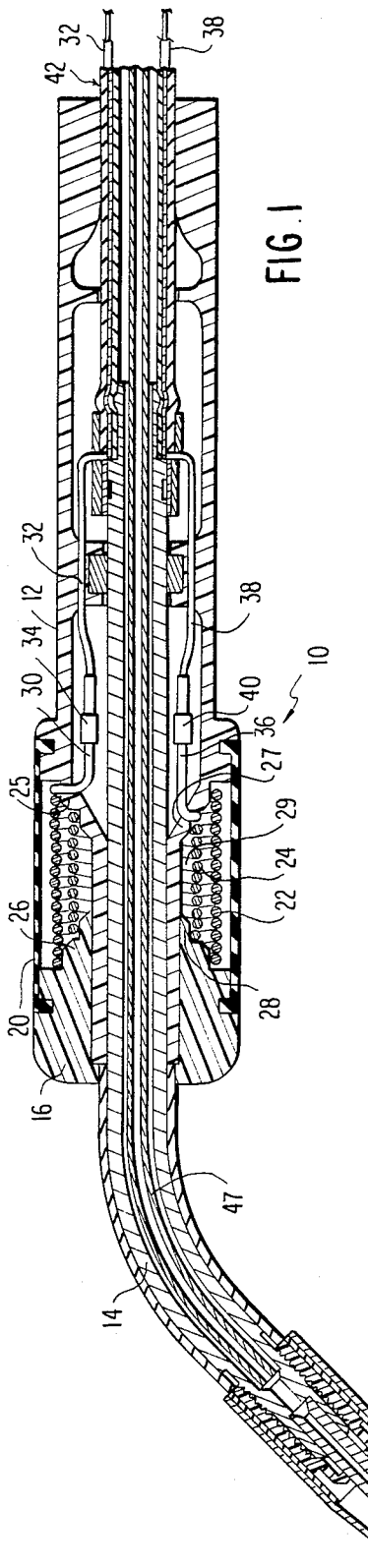
FIG 1 is a cross-sectional view of a preferred embodiment of the invention employing two wound coil spring elements.
Figure 2:
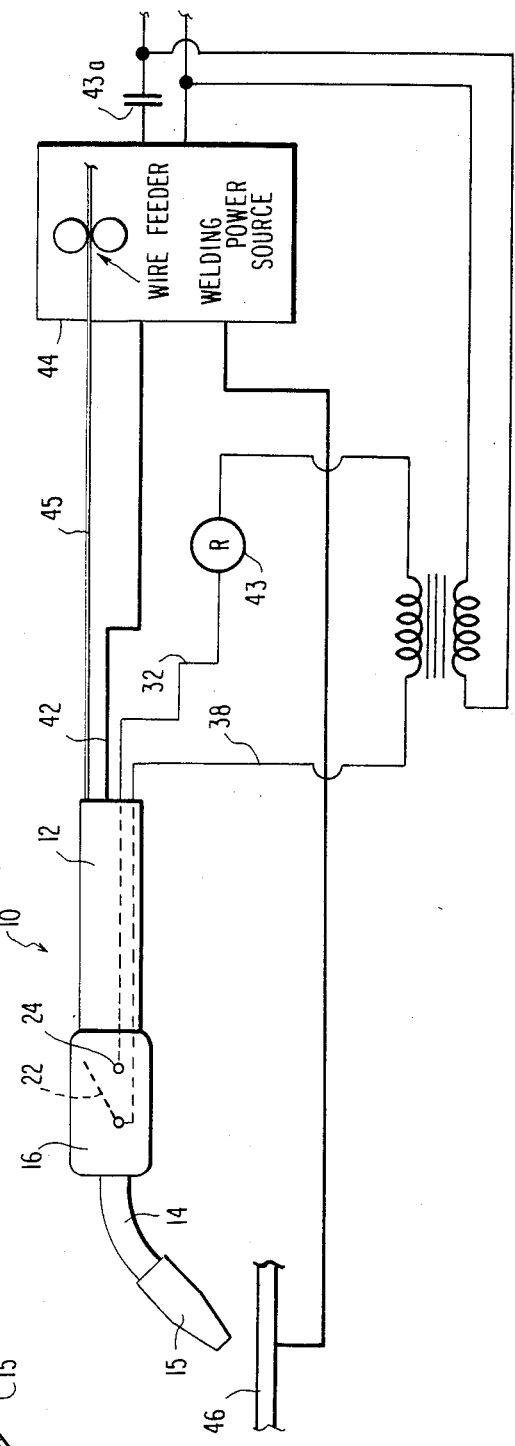
FIG. 2 is a schematic circuit and block diagram of a typical welding system incorporating the invention.

FIGS. 1 and 2 illustrate a preferred embodiment of the invention. A welding gun 10 is of the type used for gas metal arc welding and consists of a cylindrical tubular rigid plastic casing 12 enclosing a head tube 14 through which shielding gas passes from right to left, eventually emerging from a nozzle 15 connected to the end of the head tube. Head tube 14 also encloses a monocoil liner 47 through which a welding wire 45 passes from right to left, ultimately existing from contact tube 48. The welding gun has a generally cylindrical tubular handle portion 16 also made of rigid plastic which in conjunction with casing 12 provides a means to support rubber boot or sleeve 20 which forms a flexible, electrically insulating wall between the rigid handle portion 16 and casing 12. Spaced radially inwardly from the flexible wall 20 is an outer switch coil spring 22 made of conducting material, such as spring brass, phosphor bronze, beryllium copper or plated steel. Spaced radially inwardly from outer switch spring 22 is an inner switch coil spring 24 which is also made of conducting material. The springs 22 and 24 are supported on internal shoulders 25, 26 and 27, 28 respectively, of handle portion 16 and casing 12. Shoulders 27 and 28 provide a cylindrical space or void 29 beneath spring 24, thereby permitting an inward overtravel of the springs when they are depressed.

An end portion 30 of switch spring 22 is connected to a switch lead 32 by means of a connector 34. An end portion 36 of the inner switch spring 24 is similarly connected to another switch lead 38 by means of a connector 40. These leads are contained within a welding cable 42 which exits from the back end of welding gun 10. The leads are connected to a circuit containing start/stop relay 43 which operates its contacts 43a to close a circuit to a conventional welding power source and wire feeder 44 which initiates a welding process by applying a voltage to the welding wire 45 and initiating operation of a wire feeder to produce an arc between the welding wire and a workpiece 46.

In operation, when the welding machine operator desires to initiate a welding process, he depresses the flexible insulating wall 20 radially inwardly with either his thumb or a finger. When the outer switch spring 22 is engaged by the wall, it is also depressed radially inwardly until it engages the inner switch spring 24, thereby forming an electrical connection between the two springs and completing the circuit through the switch leads 32 and 38, thus allowing control power to flow through the switch leads to energize the start-stop relay 43 and start the arc welding process. The void or space 29 beneath the inner switch spring 24 provides for the desired overtravel of the switch formed by the two springs. When the operator desires to interrupt the welding process, he releases the pressure from the flexible wall 20, thereby permitting both springs to return to their original positions so that the electrical contact between them is interrupted, whereby the start-up relay 43 opens and terminates the welding process.

It is important to note that such a switch mechanism is multi-directional in the sense that the operator can depress the wall portion 20 at any point on the circumference thereof in order to cause the two springs to engage each other and operate the start-stop relay; thus, there is no need to relocate the switch relative to the welding gun handle in order to accomodate different welding positions. Furthermore, the void 29 provides for overtravel, so that, if the operator does reposition his hand and relax the pressure on wall 20, the switch is not so sensitive that it will immediately open, but rather the springs will stay in contact with each other as they move together outwardly. Also, the combination of the flexible wall 20 and the two wound coil springs 22 and 24 provides a switch which is easily depressed.

The switch is not limited to gas metal arc welding guns alone, but can be used to control the starting and stopping of other welding processes. Further, the switch is very simple and very rugged and has only two moving parts, the two springs 22 and 24. Furthermore, the multi-directional switch does not increase the diameter of the gun handle portion 16 and handle casing 12 since a trigger mechanism is not required. In addition, all electrical wiring is internal to the handle. Also, there is no need to disassemble the gun or to use tools in order to relocate the switch when the operator changes the position of the welding gun in his hand.

Figure 3:
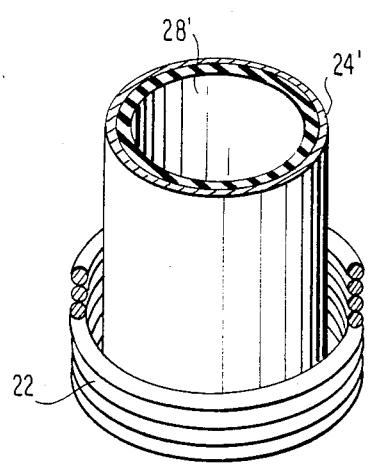
FIG. 3 illustrates another embodiment of the invention in which the inner coil spring element is replaced by a rigid metallic tube which may or may not be suspended by sponge rubber or other material to obtain a degree of overtravel.

FIG. 3 shows another embodiment of the invention in which a rigid metallic tube 24' is used in place of the inner contact coil spring 24. In this case, the tube 24' may be supported on a soft sponge rubber mounting 28' which will deflect upon depression and provide overtravel.

Figure 4:
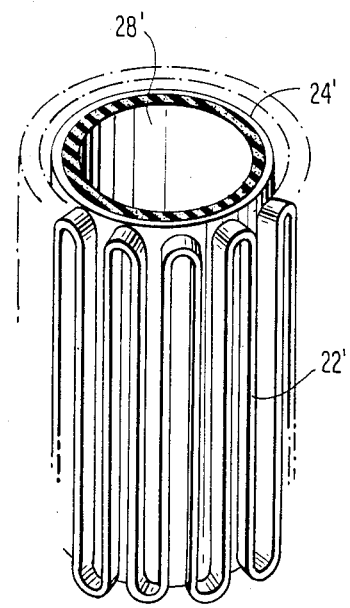
FIG. 4 illustrates another embodiment of the invention wherein the outer wound coil spring is replaced by an accordiontype spring.

As shown in FIG. 4, the outer coil spring 22 may be replaced by an accordion-type spring 22' which is used in conjunction with the rigid tube 24' and soft sponge rubber mounting 28'.

Figure 5:
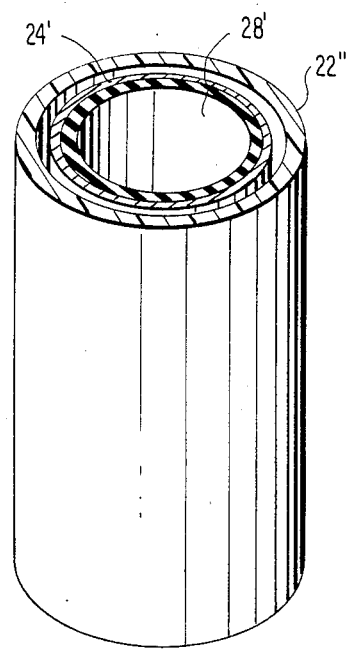
FIG. 5 is another embodiment of the invention wherein the outer coil spring element is replaced by a tube made of conducting plastic or rubber.

As shown in FIG. 5, the outer spring 22 can also be replaced with a tube 22" made of conducting plastic or rubber material.

Figure 6:
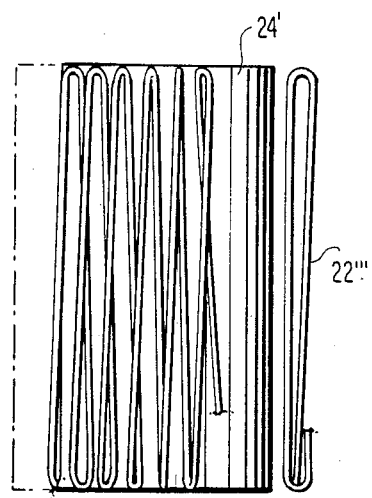
FIG. 6 illustrates another embodiment of the invention wherein the outer spring element is an oval spring.

FIG. 6 shows yet another embodiment wherein the outer spring 22 is replaced with an oval spring 22'''. Depressing the oval spring causes it to deflect against the rigid inner tube 24' to form the electrical connection, and overtravel is obtained from the inward compression or collapsing of the oval spring 22'''itself.

While various embodiments of the invention have been described and illustrated herein, other variations will be obvious to those skilled in the art and still be within the scope of the invention which is limited only by the following claims.

We claim:

1. In a welding gun having an elongated tubular rigid handle including a switch means for electrically completing an electrical circuit to initiate a welding process, the improvement wherein said switch means comprises:
   a flexible electrically insulating tubular wall completely surrounding a portion of said rigid handle in a circumferential opening thereof and also surrounding a corresponding portion of the longitudinal axis of the handle, said wall being manually depressible at all points around the circumference thereof inwardly toward the longitudinal axis of the handle;
   electrically conducting outer tubular spring means mounted in the handle interiorly of, and adjacent to, said flexible wall and depressible inwardly when engaged by said wall; and
   electrically conducting inner tubular spring means mounted in the handle interiorly of said outer spring means and adapted to be contacted by the depressed outer spring means to complete an electrical circuit to initiate a welding process;

wherein said outer spring means is an elongated tubular coil spring having a longitudinal axis corresponding to that of said flexible wall;

wherein said inner spring means is an elongated tubular coil spring having a longitudinal axis corresponding to that of said flexible wall; and wherein said wall, said outer spring means and said inner spring means are cylindrical and coaxial.

2. The improvement defined in claim 1 further comprising an electrical circuit, and electrical conductor means connecting said outer spring means and said inner spring means to said electrical circuit.

3. The improvement as defined in claim 1 wherein the opposite ends of both said inner and outer tubular coil springs are supported on said handle.

4. In a welding gun having an elongated tubular rigid handle including a switch means for electrically completing a circuit to initiate a welding process, the improvement wherein said switch means comprises:

a flexible electrically insulating tubular wall completely surrounding a portion of said rigid handle in a circumferential opening thereof and also surrounding a corresponding portion of the longitudinal axis of the handle, said wall being manually depressible at all points around the circumference thereof inwardly toward the longitudinal axis of the handle;

electrically conducting outer tubular spring means mounted in the handle interiorly of, and adjacent to, said flexible wall and depressible inwardly when engaged by said wall; and electrically conducting inner tubular spring means mounted in the handle interiorly of said outer spring means and adapted to be contacted by the depressed outer spring means to complete an electrical circuit to initiate a welding process;

wherein said outer spring means is an elongated tubular coil spring having a longitudinal axis corresponding to that of said flexible wall;

wherein said inner spring means is an elongated tubular coil spring having a longitudinal axis corresponding to that of said flexible wall; and wherein the handle has a circumferential void interiorly of said inner spring means to permit inward overtravel of said inner spring means.

5. In a welding gun having an elongated tubular rigid handle including a switch means for electrically completing a circuit to initiate a welding process, the improvement wherein said switch means comprises:

a flexible electrically insulating tubular wall completely surrounding a portion of said rigid handle in a circumferential opening thereof and also surrounding a corresponding portion of the longitudinal axis of the handle, said wall being manually depressible at all points around the circumference thereof inwardly toward the longitudinal axis of the handle;

electrically conducting outer tubular spring means mounted in the handle interiorly of, and adjacent to, said flexible wall and depressible inwardly when engaged by said wall; and electrically conducting inner tubular means mounted in the handle interiorly of said outer spring means and adapted to be contacted by the depressed outer spring means to complete an electrical circuit to initiate a welding process;

wherein said inner tubular means is a rigid metal tube; and further comprising means resiliently mounting said tube in the handle to permit overtravel of said inner tubular means when contacted by said outer spring means.

6. The improvement defined in claim 5 wherein said outer spring means is an accordion spring.

7. The improvement defined in claim 5 wherein said outer spring means is a resilient tube made of a conducting plastic material.

8. The improvement defined in claim 5 wherein said outer spring means is a oval spring, the depression of which causes compression of the oval spring to provide overtravel.

* * * * *